United States Patent
Chou (10) Patent No.: US 8,601,152 B1
(45) Date of Patent: Dec. 3, 2013

(54) IN-BAND SECURITY PROTOCOL DECRYPTOR AND SCANNER

(75) Inventor: Randy Y. Chou, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 2095 days.

(21) Appl. No.: 11/497,459

(22) Filed: Jul. 31, 2006

(51) Int. Cl.
*G06F 15/16* (2006.01)

(52) U.S. Cl.
USPC .......................................................... 709/236

(58) Field of Classification Search
None
See application file for complete search history.

(56) References Cited

U.S. PATENT DOCUMENTS

| 7,055,027 | B1 * | 5/2006 | Gunter et al. ................. 713/151 |
| 2003/0233328 | A1 * | 12/2003 | Scott et al. ...................... 705/50 |
| 2006/0005240 | A1 * | 1/2006 | Sundarrajan et al. ........... 726/15 |

* cited by examiner

*Primary Examiner* — Minh-Chau Nguyen
(74) *Attorney, Agent, or Firm* — Blakely, Sokoloff, Taylor & Zafman LLP (57) ABSTRACT

An in-band decryptor and scanner (IBDS) for monitoring data packets or frames of an encrypted communication session. The IBDS may reroute or process the data packets or frames prior to reaching their destination. The IBDS may be used to decrease the load on a server by decrypting, preprocessing or rerouting the incoming data without altering the endpoints of the encrypted communication session from the server and a client.

18 Claims, 4 Drawing Sheets

IN-BAND SECURITY PROTOCOL DECRYPTOR AND SCANNER

BACKGROUND

1. Field of the Invention

The embodiments of the invention relate to a method and apparatus for in-band processing of data traffic. Specifically, embodiments of the invention related to a method and apparatus for in-band decryption and analysis of data traffic without terminating a session between two endpoints.

2. Background

Encrypted communication is in common use over networks and the Internet to protect sensitive data from being intercepted and misappropriated. An encrypted communication session is established through an initial key exchange protocol such as the Internet Key Exchange (IKE) protocol used by the Internet Protocol Security (IPSec) protocol. This process takes place between the two endpoints or termination points of the communication session in order to determine a set of keys that will be known only to the two endpoints that can be used for encryption of data traffic between the two endpoints. Other security protocols that are in common use include the point to point tunneling protocol (PPTP), secure socket layers (SSL), transport layer security (TLS) and similar protocols. These protocols may utilized or paired with encryption protocols such as the Diffie-Helman algorithm, Rivest, Shamir, Adleman (RSA) or similar encryption protocols some of which may utilize perfect forward secrecy (PFS).

These communication sessions often take the form of virtual private network (VPN) connections, session initiation protocol (SIP) based sessions and similar sessions. These communications sessions allow a remote computer to communicate with a server securely. Multiple encrypted communication sessions may be setup simultaneously, each between a remote client computer and a server. However, this places a high load upon the server, because it becomes responsible for handling all of the encrypted communication services including the decryption of the data traffic. Many VPN client software programs require that the VPN clients be terminated at the server and client computers and not at a third device. This configuration does not permit the load to be dynamically distributed to other servers, because the other servers are not able to decrypt the data traffic to process it. Instead a client must make a direct connection to another server to divide the load. This makes the management of the load across a set of servers inefficient.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

In the following description, for the purpose of explanation, numerous specific details are set forth in order to provide a thorough understanding of the various embodiments. It will be apparent to one of ordinary skill in the art that the embodiments may be practiced without some of these specific details. In other instances, certain structures and devices are omitted or simplified to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 1:
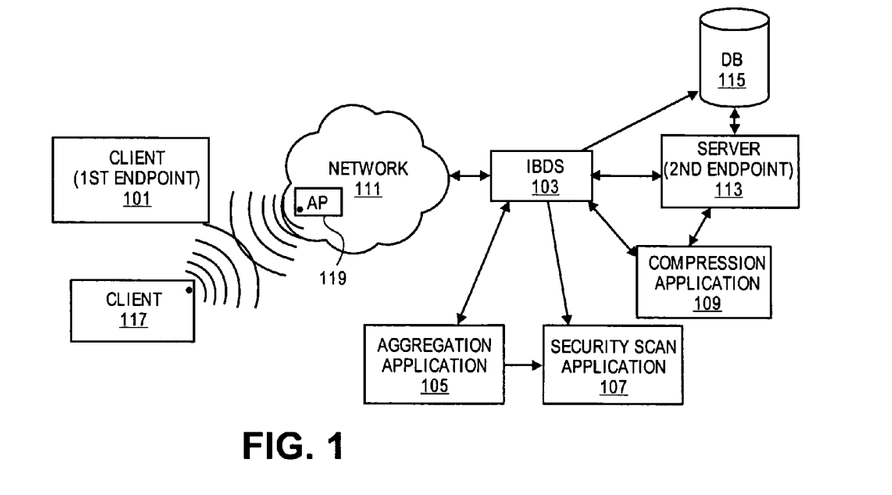
FIG. 1 is a diagram of one embodiment of a in-band decryption and scanning system.

FIG. 1 is a diagram of one embodiment of an encrypted communication system using an in-band decryptor and scanner (IBDS). In one embodiment, a client 101 may be in communication with a server 113 over a network 111. A client 101 may be a desktop, workstation, handheld or other computing device. The server may be a desktop, workstation, mainframe or other type of computing device. Any number of clients 101, 117 may be in communication with the server 113. Each client 101, 117 may have a separate communication session with the server 113. The clients 101, 117 may have any type of communication connection with the network including a wired 101 or wireless connection 117. In the case of a wireless connection, the client 117 may connect to the network 111 through an access point 119. The access point may be a wireless router, another computer or similar device having wireless communication capabilities.

The network 111 may be any type of network including a local area network (LAN), a wide area network (WAN) such as the Internet or similar network. The network 111 may include any combination of interconnected machines and any combination of communication media including wired and wireless connections. The server 113 and client 101 may communicate using any communication protocol. An encrypted communication session may be established between the client 101 and server 113 as part of a virtual private network (VPN), session initiation protocol (SIP) based session or similar secure session over the network. Any security or encryption protocol may be utilized including IPsec, PPTP, SSL/TLS, Diffie-Helman, RSA and similar security and encrypted communication protocols. The example embodiments described herein primarily are based on the use of IPsec. However, those skilled in the art will understand that the other security and encryption protocols are equally applicable and within the scope of this invention.

The server 113 may provide any type of service to a client including web application services, email services, database services or similar services. If the server 113 is communicating using unsecured or unencrypted communication sessions then the data traffic between the client and server may be rerouted or intercepted by an intermediate device to scan the packets for security risks, to direct the packets to other applications or similarly diminish the load on the server 113. However, if the communication sessions between the clients 101, 117 and server 113 are secured or encrypted then typically data traffic cannot be rerouted prior to reaching the server 113, because only the respective client 101, 117 and server 113 can decrypt the content of the data traffic from their session to determine its contents.

In one embodiment, an in-band decryptor and scanner (IDBS) 103 may be used to manage traffic to the server 113. The IDBS 103 utilizes the security information of the encrypted communication session between a client 101 and server 113 to monitor the data traffic between them. For example, shared keys of the encrypted communications session may be known to the IBDS and used to scan and reroute packets without the knowledge of either endpoint and without the IBDS serving as a termination point for the communication session. The IDBS 103 may perform some services of the router itself to diminish the load on the router or may reroute the data traffic to other devices or servers to diminish the load on the server 113 by bypassing the server altogether by providing the data traffic to a target application or device or by processing the packet itself such as decrypting the packet. The IDBS 103 may partially or completely decrypt each data packet or frame. The IDBS 103 may then analyze the data packet or frame to determine an associated application to which it is to be forwarded.

In one embodiment, the IBDS 103 may forward data traffic to an aggregation application 105, security scan application 107, a compression application 109, a database 115, a decryption application or similar application, module or device. The data traffic may subsequently be forwarded from these applications to the other applications or to the server itself. For example, data traffic may be aggregated by the aggregation application 105, scanned by the security application 107 and then compressed by the compression application before being forwarded to server 113.

In one embodiment, an aggregation application 105 may be provided on a separate device or server from the IBDS 103 or server 113. The aggregation application 105 may take multiple data packets and combine these packets into a larger packet by concatenation or similar process. Aggregation decreases the total data to be transmitted by reducing the amount of header information and makes the processing of the data more efficient by allowing other processes to work on a larger data set. In another embodiment, the aggregation application 105 may be integrated with the IBDS 103.

In one embodiment, the security scan application 107 may be provided on a separate device or server from the IBDS 103 or server 113. The security scan application 107 may scan a data packet or frame for viruses, spyware, malware and similar security risks. The scanned packets may then be forwarded to the server 113 or other application for further processing. In another embodiment, the security scan application 107 may be integrated with the IBDS 103.

In one embodiment, the compression application 109 may be provided on a separate device or server from the IBDS 103 or server 113. The compression application 109 may apply a compression algorithm to the data packets or frames received by the IBDS 103. The compressed data packets or frames may then be forwarded to the server 113 or to another application. Compressing the incoming data decreases the bandwidth requirements for the server 113 and facilitates the storage of the incoming data at the server. In another embodiment, the compression application 109 may be integrated with the IBDS 103.

In one embodiment, the data packets or frames may be forwarded to a database 115 or database management system. The database 115 may be the intended recipient or an intermediate recipient of the data intended for another application. The database 115 may be a relational database, object oriented database or similar database system. The database 115 may be utilized by applications on the server 113 or applications on other devices.

Figure 2:
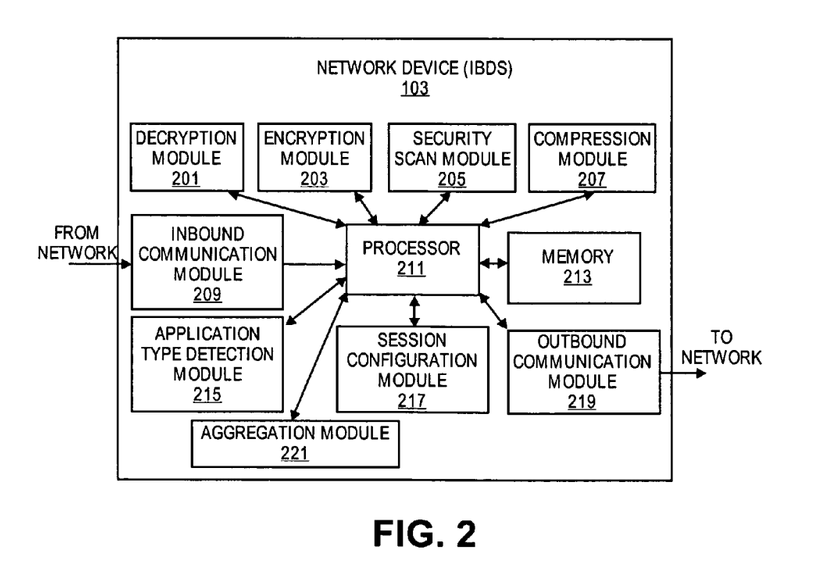
FIG. 2 is a diagram of one embodiment of an in-band decryptor and scanner (IBDS).

FIG. 2 is a diagram of one embodiment of an IBDS 103. The IBDS 103 may include a decryption module 201, an encryption module 203, a security scan module 205, a compression module 207, an inbound communication module 209, a processor 211, a memory 213, an application type detection module 215, a session configuration module 217, an outbound communication module 219 and similar components. Each of the components may be implemented as discrete hardware components in the IBDS 103 or may be implemented as software stored in the memory 213 or similar storage device and executed by a processor 211.

The IBDS 103 may include any type of processor 211 such as a general purpose processor, an application specific integrated circuit or similar processor. The processor 211 may use the memory 213 as a working memory to execute application modules or similar software. The memory 211 may be random access memory (RAM) such as dynamic or static RAM. In one embodiment, the IBDS may have multiple memory or storage devices including working memory and long term storage devices such as a hard drive.

In one embodiment, a decryption module 201 may be used by the IBDS 103 to decrypt incoming data packets or frames to allow them to be further processed using other application modules or to provide decryption services to minimize the load on one of the endpoints of an encrypted communication service without serving as termination point for the connection. The decryption module 201 may use the key information or similar encryption information provided by an administrator or obtained through facilitation of the establishment of the encrypted communication as discussed further herein below.

In one embodiment, an encryption module 203 may be utilized to encrypt data packets or frames. The encryption module 203 may be used to encrypt data prior to transmission. The encryption module 203 may be used to re-encrypt data that has been decrypted to be analyzed or inspected by the IBDS 203. The data may be encrypted using a different key or similar security mechanism dependent on the destination of the data packet/frame. For example, a client may send a data packet destined for a target server. The data packet is encrypted using a key A. The IBDS 103 intercepts this packet and decrypts the packet using the decryption module 201 and the key A provided by an administrator or through other mechanisms. The IBDS 103 may inspect the decrypted data packet to determine if any viruses or similar security threats are present in the data packet or frame. The data packet or frame may then be re-encrypted using the encryption module 203 and a key B provided by an administrator or through similar monitoring of the established encrypted communication session.

In one embodiment, the security scan module 205, compression module 207, and aggregation module 221 may perform the same or similar tasks to those performed by external modules as set forth above. These modules may be used individually or in combination with one another and other modules to process the data packets or frames received by the IBDS 103.

In one embodiment, the IBDS 103 may include an application type detection module 215. The application type detection module 215 may analyze a decrypted packet or frame or set of packets or frames to determine an application associated with that data type. The data packets or frames may include an indicator or data type or the data type may be determined from an analysis of the payload of the packet or its intended destination address, port or similar information. The data type may be used to reroute the packet or to select services to be performed on the packet or frame prior to forwarding the packet or frame.

The IBDS 103 may include inbound and outbound communications modules (209, 219). In another embodiment, a single communication module may handle incoming and out going communications. The inbound and outbound communication modules (209, 219) handle the buffering, transmission and similar aspects of the transmission and reception of data packets or frames to and from the network. The inbound and outbound communication modules (209, 219) may communicate through the same network connection or may communicate through separate connections or on separate networks.

In one embodiment, the IBDS 103 may include a session configuration module 217 to manage or track information related to each session. The session configuration module 217 may track and store security or encryption data such as keys, protocols, encryption type and similar information for each session that the IBDS 103 is monitoring. This configuration module 217 may be used by other application modules to obtain or update this session information. In one embodiment, an administrator may be able to communicate with or access the session configuration module 217 to provide security information for a session. In another embodiment, the session configuration module 217 may automatically analyze data packets or frames to detect key exchanges or similar data that is used to establish a secure connection between two termination points. This data may be automatically collected to allow the IBDS 103 to decrypt the traffic on this secure connection without being a termination point for the traffic. For example, the session configuration module 217 may detect messages from the client or server requesting authentication as well as related reply messages to obtain the keys and similar information exchanges between the client and server without the knowledge of either the client or server and without terminating the communication session between them.

Figure 3:
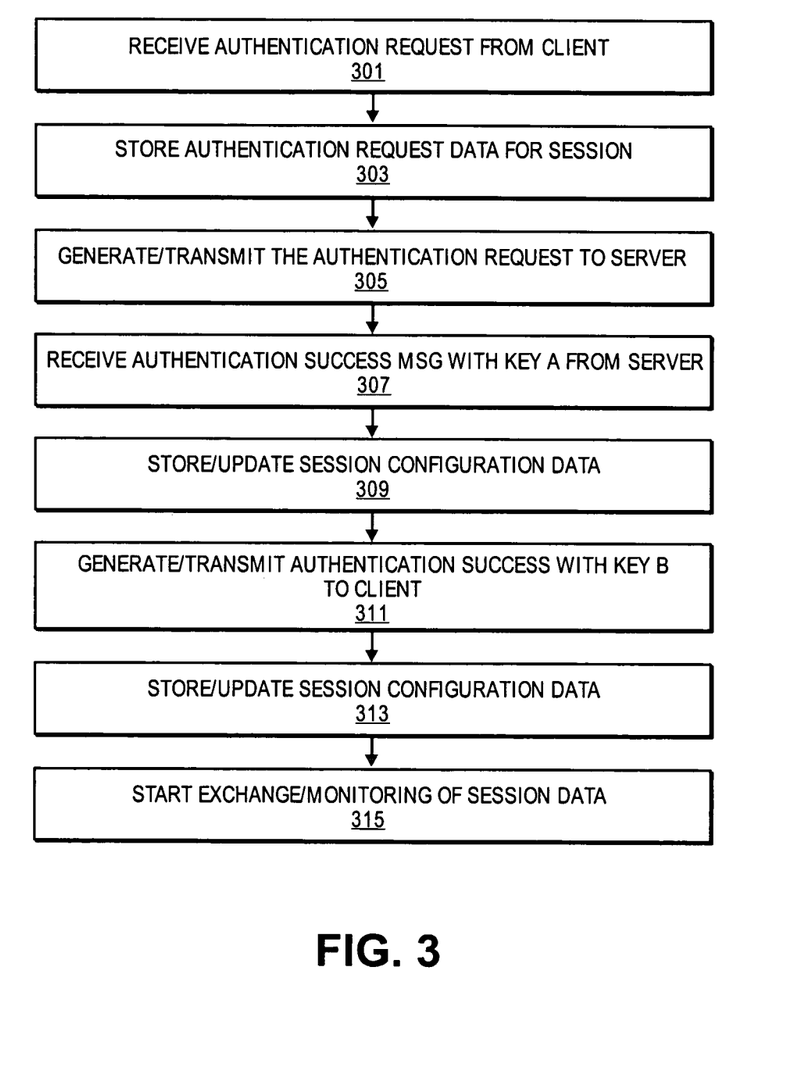
FIG. 3 is a flowchart of one embodiment of a process for authenticating an encrypted communications session at the IBDS.

FIG. 3 is a flowchart of one embodiment of a process for authenticating an encrypted communication session at the IBDS. This process may be utilized to set up an encrypted communication session between two endpoints in a manner transparent to each endpoint such that each endpoint is a termination point for the communication session. In one embodiment, this may be carried out by the IBDS collecting data from the authentication messages and then passing that authentication on to its destination. In another embodiment, the IBDS may replace this data with its own, generate a replacement message and then send that message in place of the original to the destination. In this embodiment, the IBDS may use separate communication, security or encryption protocols for each endpoint of the session. However, the endpoints still address each other and the data traffic is intercepted by the IBDS. Thus, the IBDS does not terminate the session. In a further embodiment, the IBDS may terminate communication in or both directions and establish separate sessions with each endpoint.

Example embodiments of the non-terminating embodiments are discussed herein below. One of ordinary skill in the art would understand in light of this discussion that equivalent terminating processes are envisioned and within the scope of the invention. The example of a client establishing a session with a server is provided below for sake of clarity. In other embodiments, a server or other device may initiate a session.

In one embodiment, an authentication process may be initiated if a request is received by the IBDS from a client to establish or authenticate an encrypted communication session that is destined for the server (block 301). The IBDS intercepts this request for authentication. The IBDS may be positioned in a network such that any data traffic destined for the server must pass through the IBDS. The IBDS then stores the authentication request data (block 303). This data may be used to track the encrypted communication session. The data stored may include information about the two endpoints such as their internet protocol (IP) addresses and similar information. The data stored may also include security information such as keys and protocol types in the authentication request.

The IBDS may then generate or transmit an authentication request to the server (block 305). In one embodiment, the IBDS may forward the same request that was received from the client. In another embodiment, the IBDS generates a new authentication request to send to the server. The new authentication request may utilize the same protocols as the received authentication request or may use a different authentication protocol. The authentication request may also use new security information such as keys generated by the IBDS. This data may also be stored with the session data. The authentication request may spoof the client; it may include the address or similar identification message of the client, in this manner the server will believe that the authentication message is from the client and not the IBDS.

In response to the authentication request sent to the server an authentication success message may be received by the IBDS from the server (block 307). The authentication success message may include a secret key or similar security information. The authentication reply message data may be stored with the other session data (block 309). The stored data may include the secret key or similar security information that will allow the IBDS to decrypt the data traffic received from the server.

In one embodiment, the IBDS may forward the received authentication reply to the client. In another embodiment, the IBDS may generate a reply to the authentication request (block 311). The IBDS may generate a secret key or other security information for the reply. The reply may include identification information for the server to make the client believe that the reply was generated by the server. This generated reply message may then be sent to the client.

In one embodiment, the IBDS also stores the information sent to the client (block 313). This information is added to the other session data collected. In one embodiment, a separate record or set of records may be used to store data for each of the sessions. This data may be stored entirely within the IBDS or may be partially or completely stored on another device such as a server in communication with the IBDS.

In one embodiment, after the reply message is sent from the IBDS to the client, encrypted communication may start between the client and the server (block 315). The IBDS may decrypt and analyze any of the data packets for the session using the stored security information for the session including the keys and protocol information necessary to decrypt the packets, as well as, re-encrypt them, if necessary to be sent on to the server.

Figure 4:
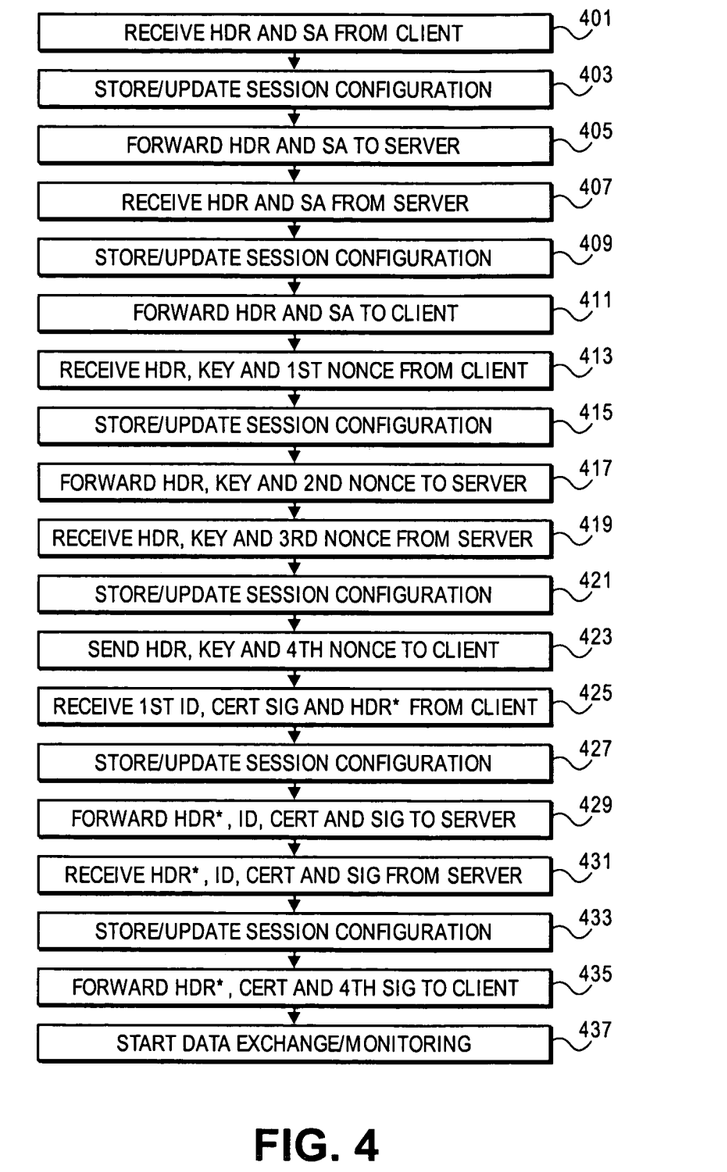
FIG. 4 is a flowchart of one embodiment of a process for authenticating an encrypted communications session using the Internet Key Exchange (IKE) and Internet Protocol Security (IPSec) protocol.

FIG. 4 is a flowchart of one embodiment of a process for authenticating an encrypted communications session using the Internet Key Exchange (IKE) and Internet Protocol Security (IPSec) protocol. This process is similar to the general process described above. This process is an example specific to the use of IKE and IPSec. One of ordinary skill would understand that other similar processes are within the scope of this invention, including processes suited for PPTP, SSL/TLS and similar processes. IKE is defined in RFC 2409. For purposes of clarity, only those aspects of IKE that are relevant to the embodiments of the invention are discussed herein.

The following example embodiment, for sake of clarity describes a client initiation a session with a server. Other embodiments may include a server or other devices initiating a session with a client or other devices initiating a session with the server or other devices.

In one embodiment, the process may be initiated when the client sends a message to the server including a header (HDR) and a security association (SA) (block 401). The IBDS intercepts this request and stores HDR and SA data in a record associated with the session being monitored (block 403). If the data is for a session that has not been previously tracked then a new session file or set of files may be created to store the information.

In one embodiment, in response to receiving the request, a message is forwarded to the server from the IBDS (block 405). In another embodiment, the IBDS creates a new message with new header information and a new SA.generated by the IBDS and forwards it to the server in place of the received message. The generated message may indicate the source as the client to maintain the client and the server as the endpoints of the session.

In response to sending the message to the server, the server sends a response message with a header and a security association (block 407). The response header information and security association data are collected by the IBDS to be stored with and update the session data (block 409).

In one embodiment, the response message including the header and security association may be forwarded to the client (block 411). In another embodiment, the IBDS may generate new header and security association data to send to the client. The generated message may indicate the server as the origin of the message to maintain the client and the server as the endpoints of the session. If new header and security association data are generated this data may be used to update the stored session data.

After the client receives the response header and security associations a second message may be generated and sent to the server including a header, a key and a first nonce (block 413). This message may be intercepted by the IBDS. The IBDS stores the header, key and nonce information (block 415).

The IBDS may then forward the second message from the client to the server (block 417). In another embodiment, the IBDS may generate key, nonce and header information to be used in place of the received data. This data may also be stored and the message forwarded to the server.

A second response message may then be received from the server including a key, a further nonce and similar data and related header information (block 419). This data may be added to the stored session data (block 421). The second response may be forwarded to the client or replacement data may be generated by the IBDS and sent in its place (block 423).

A third round of messaging is then started by the client. The client sends a message including header information and an encrypted payload that may include encrypted identification data (ID), certification data (CERT) and signature data (SIG) (block 425). This message is also intercepted by the IBDS and the relevant information is stored by the IBDS (block 427). The IBDS then forwards this message or creates a replacement message that is sent to the server in its place (block 429). If a replacement message with new ID, CERT and SIG information is sent, then this data is also added to the session file.

The IBDS intercepts the third round reply message from the server including an encrypted payload with reply ID, CERT and SIG data (block 431). The IBDS updates its session data with this ID, CERT and SIG data (block 433). In one embodiment, the IBDS then forwards this message to the client (block 435). In another embodiment, the IBDS generates a new reply message including new ID, CERT and SIG information. This generated information is added to the session file. The generated information still indicates the server as the source to maintain the client and server as the endpoints of the session.

The normal operation of the encrypted communication session may begin when the final reply is received by the client (block 437). The IBDS can monitor the data traffic by decrypting it using the session data collected during the authentication process using the keys, CERTs, SIGs and similar data in the session file to decrypt and access the encrypted data in a process that is transparent to the two endpoints. The IBDS may re-encrypt the data to send it on to the server or client depending on the direction of the traffic. The IBDS may process the data before forwarding it to the client or server or may bypass either one and send the data to another device for further processing or storage.

Figure 5:
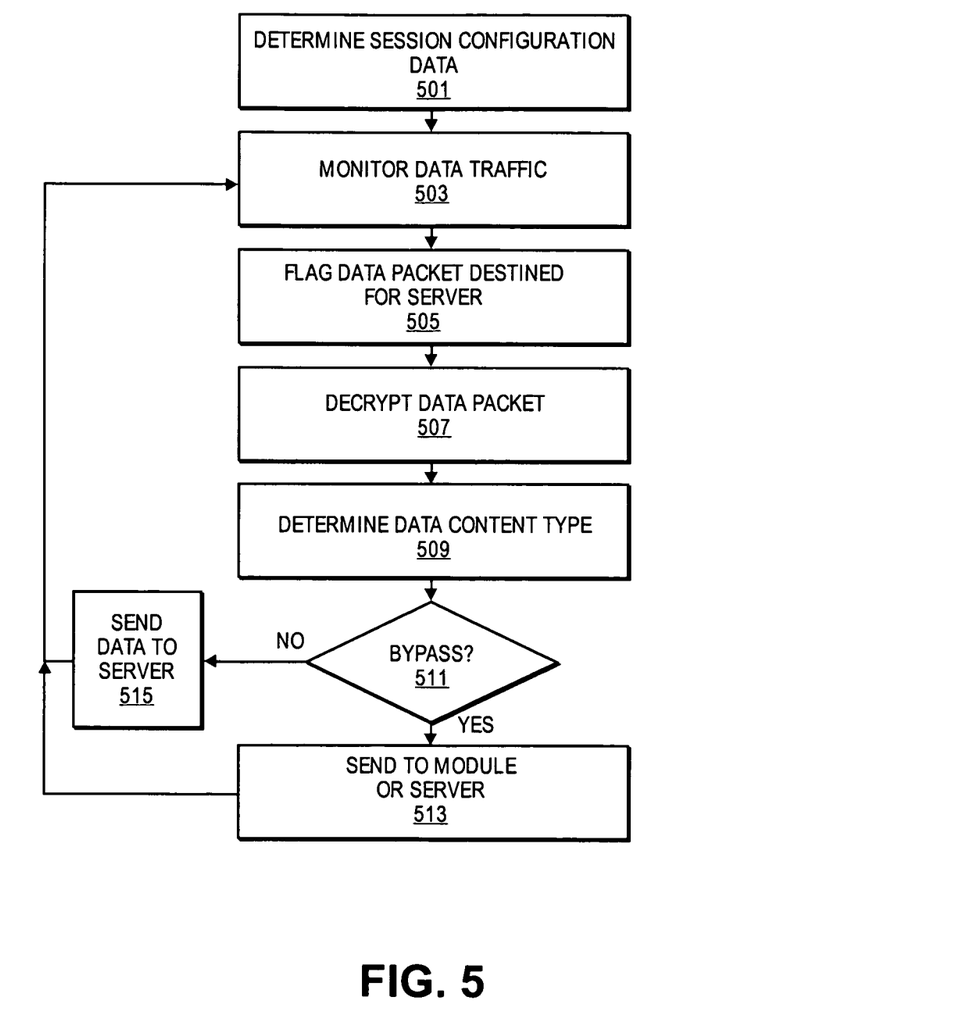
FIG. 5 is a flowchart of one embodiment of a process for data traffic processing by the IBDS.

FIG. 5 is a flowchart of one embodiment of a process for data traffic processing by the IBDS. In one embodiment, the IBDS processes traffic that pass through the device. The traffic may be received from any type of network connection and may have any destination. The traffic that is processed by the IBDS may be sent to any address, such as any IP address or similar communication protocol identification address. In one embodiment, the IBDS is placed in a network at a point that will require data to pass through it to reach a specific device such as a server or client. The IBDS can then be used to manage traffic destined for that device.

In one embodiment, the IBDS may monitor and collect session configuration data including data exchanged between two endpoints of a session to set up an encrypted session (block 501). The collected session data may be used to decrypt and monitor the encrypted session data. This data may be collected as discussed above. In another embodiment, the data necessary for monitoring the session may be provided by an administrator or similar source.

Each packet or frame that is received by the IBDS may be examined to determine if it belongs to a session that is being monitored (block 503). The address of the packet or similar information may be examined to determine which session if any that the packet belongs to. If the data packet or frame is part of a session that is not one that is currently tracked then a new session configuration file may be created.

If a data packet or frame is detected that is intended for a destination, such as the server, or associated with a session that has been designated to be processed then the packet or frame may be flagged for further processing (block 505). Data packets or frames that are not going to an address that is being monitored or associated with a monitored session may be forwarded toward their destination in accordance with typical routing algorithms.

A packet or frame that is going to a monitored destination or associated with a monitored session may be decrypted using the session configuration data to allow for the encrypted contents of the data packet or frame to be analyzed (block 507). In one embodiment, the entire packet or frame is decrypted. In another embodiment, only a portion of the packet or frame is decrypted such as header information or specific payload data containing data needed to identify the content of the whole data packet.

The decrypted data packet may be analyzed to determine the type of content in the packet (block 509). The data may be analyzed to determine an association of the data with an application or set of applications. For example, if a data packet or frame contains data from an email then the IBDS may determine that the destination of the data packet or frame may be a mail server. The type of data may be used by the IBDS to make a determination as to whether the destination should be bypassed and the data sent directly to the relevant application (block 511). For example, if the data packet or frame is intended for a mail server that is on a separate server from the destination address then the IBDS may determine to send the data packet or frame or its contents directly to the mail server.

If a decision to bypass the destination is made then the data packet or frame may be sent to an application associated with the data in the packet/frame (block 513). The application may take the form of a module or software in the IBDS or on a separate device such as a server. The data packet/frame may also be processed to aggregate, perform a security scan, compress or similarly process the data packet/frame prior to sending it on to its associated application.

If a decision is made not to bypass the destination then the data packet or frame may be forwarded to the destination (block 515). The data packet or frame may be processed prior to forwarding by aggregating, performing a security scan, compressing or similarly processing the data packet or frame or a set of data packets or frames. The data packet or frame may also be re-encrypted before forwarding to the destination.

In one embodiment, the IBDS may be implemented as a set of hardware components. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    detecting, at a network device, a packet or frame from an encrypted communication session between a first endpoint and a second endpoint of the session;
    decrypting the packet or frame, at the network device, transparent to the first endpoint and the second endpoint, using encryption configuration data for the intercepted encrypted communication session;
    re-encrypting the packet or frame using at least in part different encryption configuration data; and
    processing the packet or frame to reduce a load on the second endpoint.

2. The method of claim 1, wherein the first endpoint is a client and the second endpoint is a server.

3. The method of claim 1, further comprising:
    forwarding the packet or frame to the second endpoint.

4. The method of claim 1, further comprising:
    scanning the packet or frame for spyware, viruses or malware.

5. The method of claim 1, further comprising:
    identifying a type of the data; and
    forwarding the packet or frame to a module or server for processing based on the type of the data.

6. The method of claim 1, further comprising:
    aggregating data from the packet or frame with data from a second packet or frame of the encrypted communication session; and
    forwarding aggregated data to the second endpoint.

7. The method of claim 1, wherein the encryption configuration data is intercepted from communication between the first endpoint and the second endpoint.

8. The method of claim 1, wherein the encryption configuration data is provided by an administrator of the encrypted communication session.

9. A device comprising:
    a memory;
    a communications module to transmit and receive a set of encrypted data packets from a session over a network, the session being between a first endpoint and a second endpoint;
    a decryption module to decrypt the set of encrypted data packets;
    an encryption module to encrypt or re-encrypt the set of decrypted data packets using encryption keys; and
    a processor coupled to the communication module to analyze a content of the set of encrypted data packets and to reroute the set of re-encrypted data packets for processing by a module or a first server.

10. The device of claim 9, further comprising:
    a configuration module to maintain session data including encryption keys for each session.

11. The device of claim 9, further comprising:
    an application detection module to identify an application associated with the content.

12. The device of claim 9, further comprising:
    a scanning module to scan each of the set of encrypted data packets for one of a virus, spyware or malware.

13. The device of claim 9, further comprising:
    a compression module to compress the set of re-encrypted data packets.

14. The device of claim 9, further comprising:
    an aggregation module to aggregate data in the set of decrypted data packets.

15. A machine readable medium, having a set of instructions stored therein, which when executed cause a machine to perform a set of operations comprising:
    monitoring packets of an encrypted session between a first endpoint and a second endpoint;
    identifying an encrypted data packet to the second endpoint;
    decrypting the encrypted data packet using a first set of configuration data;
    re-encrypting the decrypted data packet using at least in part a second set of configuration data; and
    rerouting the re-encrypted data packet to a module or a first server to be processed according to the type of data encrypted in the encrypted data packet.

16. The machine readable medium of claim 15, having further instructions stored therein, which when executed, cause a machine to perform a further set of instructions comprising:
    authenticating a request from the first endpoint.

17. The machine readable medium of claim 15, having further instructions stored therein, which when executed, cause a machine to perform a further set of instructions comprising:
    compressing the re-encrypted data packets; and
    forwarding the compressed data packets to the second endpoint.

18. The machine readable medium of claim 15, having further instructions stored therein, which when executed, cause a machine to perform a further set of instructions comprising:

determining an application to handle the encrypted data packet based on the type of the data encrypted in the encrypted data packet.

\* \* \* \* \*